Dec. 19, 1972  E. R. MICHALIK  3,706,544
METHOD OF LIQUID QUENCHING OF GLASS SHEETS
Filed July 19, 1971  2 Sheets-Sheet 1

INVENTORS
EDMUND R. MICHALIK

BY  *Chisholm and Spencer*
ATTORNEYS

Dec. 19, 1972   E. R. MICHALIK   3,706,544
METHOD OF LIQUID QUENCHING OF GLASS SHEETS
Filed July 19, 1971   2 Sheets-Sheet 2
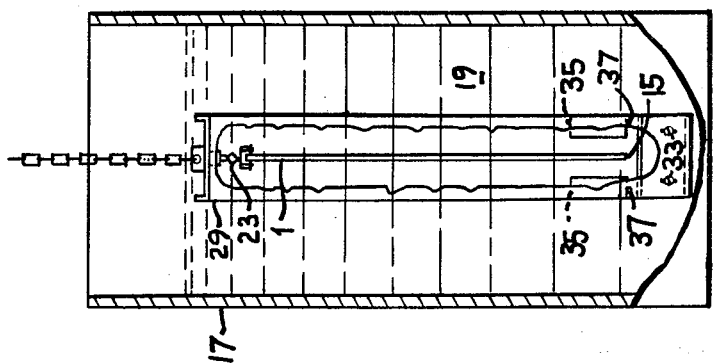
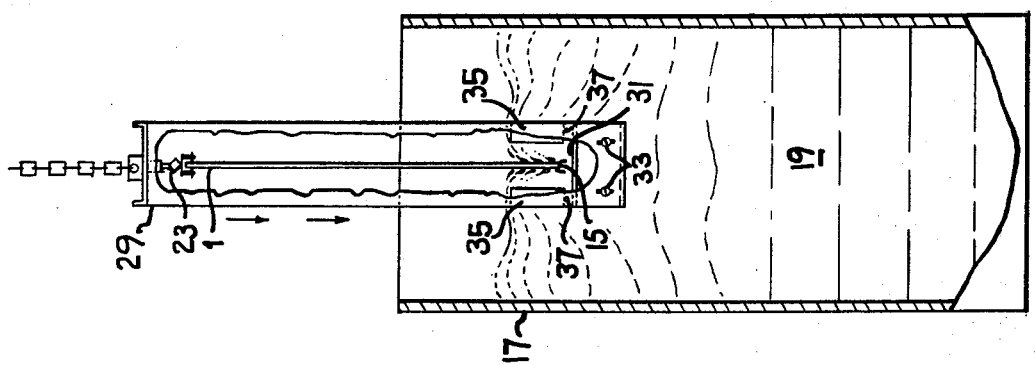
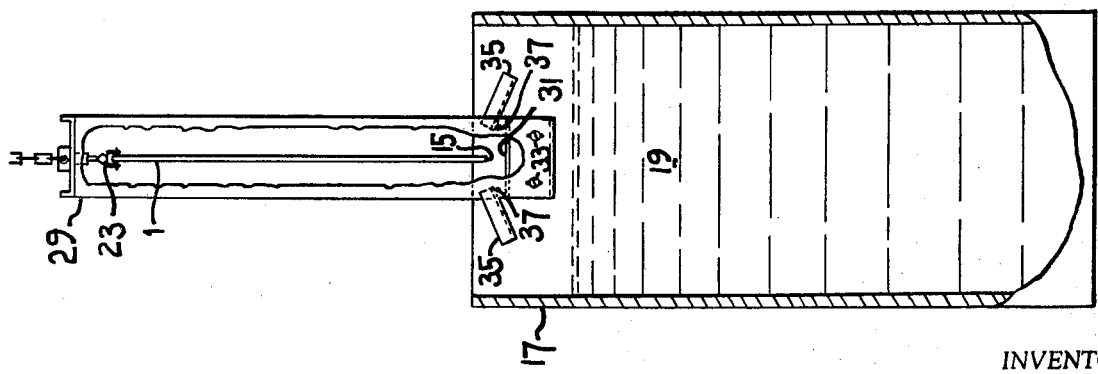
INVENTORS
EDMUND R. MICHALIK
BY
ATTORNEYS

United States Patent Office 3,706,544
Patented Dec. 19, 1972

3,706,544
METHOD OF LIQUID QUENCHING OF GLASS SHEETS
Edmund R. Michalik, West Mifflin, Pa., assignor to PPG Industries, Inc., Pittsburgh, Pa.
Filed July 19, 1971, Ser. No. 163,878
Int. Cl. C03b 27/00
U.S. Cl. 65—116                       11 Claims

ABSTRACT OF THE DISCLOSURE

An improved method for thermally tempering glass sheet by liquid quenching is disclosed. The improvement comprises a preliminary strengthening of the marginal edges of the glass sheet such that the glass sheet is better able to withstand the subsequent thermal shock of liquid quenching. The preliminary strengthening is accomplished by cooling the body of the glass sheet between marginal edges at a rate greater than the rate at which the edges are cooled. This minimizes the tensile stresses that are normally associated with the edges during liquid quenching.

In a preferred embodiment, the invention is directed to an improvement in the dip-quenching process for thermally tempering glass in which the edge which initially contacts the quenching liquid is put in compression prior to immersing the glass in the quenching liquid.

BACKGROUND OF THE INVENTION

Field of the invention

This invention is in the field of thermally tempering glass articles by liquid quenching. More particularly, this invention relates to a multiple-stage process for thermally tempering glass articles by the dip-quenching technique.

Description of the prior art

Glass sheets are thermally tempered by heating them to an elevated temperature above the glass strain point, and then suddenly chilling the glass to cool rapidly the glass surface, while the interior regions of the glass cool at a slower rate. This differential cooling results in the development of a compressive stress in the glass surface balanced by a tensile stress in the interior regions of the glass. The resultant tempered glass has a much greater resistance to fracture than does untempered glass; also, when tempered glass does fracture, its breakage pattern is significantly different than that of untempered glass in that the tempered specimen will shatter into small fragments with blunt rounded edges rather than large sharp-edged pieces which result from fracturing untempered glass. This breakage pattern gives tempered glass obvious advantages for use in transparent doors, motor vehicle closures, ophthalmic lenses and the like.

Chilling of glass sheet can take place by impinging cool air on the surface of heated glass. This technique, although suitable for tempering thicker glass, is unfortunately not completely acceptable for tempering thinner glass. Air, because of its relatively low heat transfer coefficient, does not remove heat away from the surface of the glass quickly enough to set up a significant differential cooling pattern between the surface and the interior regions of the glass. Consequently, in using air to temper thin glass bodies, only relatively low degrees of temper can be obtained.

There have been suggestions in the prior art to replace air as a cooling medium and to use instead liquids. Liquids, theoretically, because of their superior heat transfer characteristics compared to air, should remove heat much more rapidly from the glass surfaces than air does. This more rapid cooling will set up a greater differential cooling pattern between the interior and the surfaces of the glass cooled, thus creating the potential for the attaining of a higher degree of temper in the glass than possible with air tempering.

Using liquids instead of air to thermally temper glass sheet is generally referred to in the art as liquid quenching. In liquid quenching, rapid cooling of the glass is accomplished by contacting the surface of the glass with a liquid quenchant. Contacting the surface of the glass can be accomplished by various techniques, such as flowing a quenching liquid over the surface of the glass. This is known as "flood quenching" and is described in U.S. patent application Ser. No. 108,661, filed Jan. 21, 1971. Another method of contact is "spray quenching," which involves atomizing the quenching liquid into discrete liquid droplets and then spraying the surface of the glass. "Spray quenching" is well known in the metal tempering art and is disclosed, for example, in U.S. Pat. No. 3,208,742. Another method of contact is to immerse completely the glass sheet in the quenching liquid. This technique is referred to in the art as immersion quenching or dip quenching and is described in U.S. Pats. No. 170,339, 2,145,119, 2,198,739, 3,186,816, 3,271,207 and Belgian Pat. No. 729,055.

Although liquid quenching has been found to be moderately effective with rather thick glass sheets, it has not been very effective in tempering thinner glass specimens. Often the thinner glass fractures when the sheet is initially contacted with the quenching liquid. Most often, the fracture initiates at the edges of the sheet, continues into the body of the glass resulting in total breakage of the sheet.

It is theorized that one of the more important causes of fracturing of thin glass sheets in liquid-quenching processes is the fact that the edges of the glass cool at too rapid a rate when compared with the remainder of the glass sheet. In the preferred mode of accomplishing a liquid quench by dipping a glass sheet into a liquid-quenching bath, this rapid cooling of glass edges is magnified at the "leading edge" of the glass, i.e., the edge of the glass which first contacts the liquid-quenching fluid. This differential cooling is referred to as the leading edge effect. Thus, in the preferred dip-quenching method employed, this differential rate of cooling between the leading edge and the remainder of the glass sheet puts the leading edge temporarily in tension to such a degree that it readily fractures upon the subsequent thermal shock of dip quenching.

The leading edge cools at a greater rate than the remainder of the glass sheet because the leading edge dissipates heat by more mechanisms than does the remainder of the glass sheet. The leading edge dissipates heat not only because of the temperature differential between it and the quenching liquid, but also dissipates heat due to the hydrodynamic phenomena caused by liquid flow over the leading edge. Thise hydrodynamic flow of the quenching liquid over the leading edge as the glass sheet passes through the quenching liquid on immersion removes tremendous quantities of heat at a rapid rate from the leading edge. Thus, a situation is created where a relatively small area of the glass, that is the leading edge, is cooled at a much faster rate than is the remainder of the glass. This difference in the rate of cooling puts the leading edge in tension in which condition it is particularly susceptible to thermal shock and breakage.

In accordance with this invention, a technique is provided for thermally tempering glass by liquid quenching, which minimizes the problems of premature edge cooling and resultant glass fracturing.

SUMMARY OF THE INVENTION

In accordance with this invention, a method for thermally tempering glass by liquid quenching, and by dip quenching in particular, while avoiding the adverse differential cooling at the glass edges is provided. Through the practice of this invention, the edges of the glass sheet are preliminarily strengthened before the glass sheet is subjected to liquid quenching. The preliminary strengthening of the glass edges is accomplished by cooling the body of the glass between the marginal edges such that the body of the glass cools at a rate faster than the edges. This temporarily puts the body of the glass in tension which is balanced by edges going into compression.

The method of this invention is particularly useful in avoiding the leading edge effect associated with immersion (dip) quenching. For use with dip quenching the leading edge is put in compression by preliminarily cooling the body behind the leading edge such that this portion of the glass cools at a rate equal to or faster than the leading edge. This temporarily puts this portion of the glass into tension while the leading edge is put into compression. The leading edge in compression can withstand a far greater thermal shock upon subsequent dip quenching than can an unstrengthened leading edge.

BRIEF DESCRIPTION OF THE DRAWINGS

FIGS. 3, 4 and 5 are vertical, end view elevations of the apparatus shown in FIG. 2 being used to dip quench a glass sheet and its position at various stages of the quenching operation is shown.

DETAILED DESCRIPTION

Figure 1:
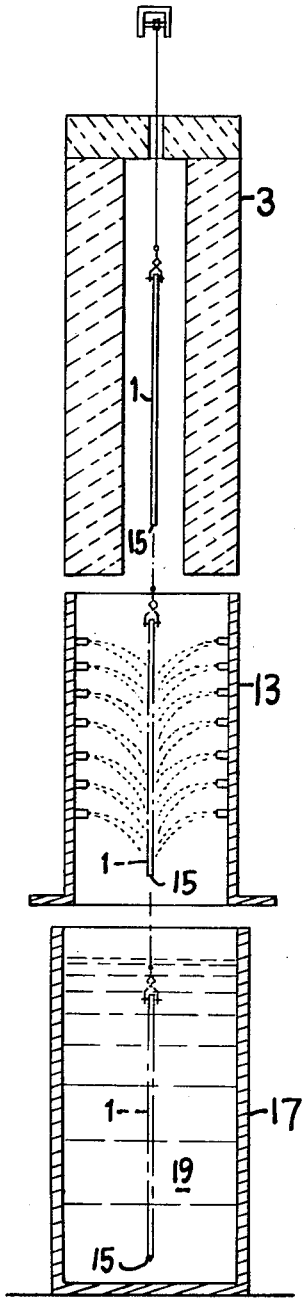
FIG. 1 is a schematic drawing of a vertical section through an arrangement suitable for tempering glass according to the method of the invention.

In conducting the method of thermally tempering glass in accordance with the practice of the instant invention, typically, a flat-glass sheet is first heated to a very high temperature, substantially above its strain point, but below its softening point. Softening point, as used herein, is that condition in which glass has a viscosity of $10^{7.6}$ poises. The temperature of the glass at its softening point will vary depending on the particular composition of the glass. For example, soda-lime-silicate glass has a temperature at its softening point of about 1400° F., borosilicate glass has a temperature at its softening point of about 1500° F. The strain point of the glass as used herein is that condition in which the glass has a viscosity of $10^{14.6}$ poises. The temperature of the glass at its strain point is also dependent on the glass composition with soda-lime-silicate glass having a temperature of about 960° F. at its strain point. Above the softening point, glass behaves as a liquid and below the strain point, glass behaves as a solid. Between the softening point and the strain point, the glass can be considered to behave as a viscoelastic material and its behavior is particularly susceptible to changes in temperature. Stresses are developed and relieved as the glass is cooled down through these points. If the cooling is rapid enough, the glass surfaces solidify and contract, being put temporarily in tension. However, since the glass core has not cooled to the extent the surfaces have and is still relatively mobile, it can relieve the surface tension by flowing and going temporarily into compression. By the time the core has solidified, its contraction is resisted by the already solid surface layers, which are now put into compression, while the core itself is put into tension. The stress distribution across the thickness of thermally tempered glass is characteristically parabolic. Typically, the regions of the glass near the surfaces to a depth of about ⅖ of the total thickness (⅕ in each surface) are in compression with a maximum value of the compressive stress at the surface of about 40,000 pounds per square inch. To balance this surface compression, the interior ⅗ of the glass thickness is in tension, the maximum tension at the center of the glass thickness having a value of about ½ the maximum surface compression.

After the glass sheet has been heated to the above-defined temperature, the marginal edges are preliminarily strengthened before the glass is subjected to subsequent liquid quenching. This preliminary strengthening is accomplished by cooling the body of the glass adjacent to the marginal edges at a rate at least as great as, preferably greater than the rate at which the edges are cooled. This differential cooling as explained above results in the body of the glass being temporarily put in tension and the adjacent edges being put in compression. A prestressed edge in compression will be better able to withstand the severe shock of subsequent liquid quenching than is an edge not so prestressed.

One method contemplated for the preliminary strengthening of the glass involves spraying or flowing a chilling liquid onto the major portion of the glass surface. This technique is shown graphically in the FIG. 1 of the drawings.

FIG. 1 is a vertical, elevated sectional drawing depicting an arrangement which is suitable in practicing the method of the invention. The drawing shows a glass sheet 1 being heated in a furnace 3. After the glass sheet has been heated to the required tempering temperature, usually a temperature somewhere near the glass softening point, the glass sheet is lowered quickly into the preliminary strengthening zone 13 where a chilling liquid strikes the opposite faces of glass sheet 1 (shown in phantom). In FIG. 1, the chilling liquid is shown as striking the opposite faces of the glass sheet in the form of a spray, however, it should be realized that the chilling liquid can be flowed onto the opposite faces of the glass sheet 1.

It should also be noted that as the glass sheet is lowered into the preliminary strengthening zone, the chilling liquid contacts the opposite faces of the glass sheet in a normal direction, whereas the chilling liquid only indirectly contacts the leading edge 15 of the glass sheet. This difference in direction of contact is sufficient to set up a differential cooling pattern between the opposite faces of the glass sheet and the edge, since the most effective heat transfer is through the normal contact of the chilling liquid with the glass surface, rather than through the indirect contact with the leading edge 15. Thus, the opposite surfaces of the glass sheet cool at a much faster rate than the marginal edges of the glass sheet 1. This difference in cooling temporarily puts the body of the glass in tension and the marginal edges in compression.

It should be realized, of course, that in cooling with the arrangement of FIG. 1, the chilling liquid can be in continuous operation such that the chilling liquid is flowing or spraying as the glass begins to pass from the furnace into the preliminary cooling zone. Alternately, the flow of the chilling liquid can be operated in a pulse fashion such that the lowering of the glass sheet 1 from the furnace 3 into the preliminary strengthening zone 13 is synchronized with the flow or spray of the chilling liquid such that after the glass sheet 1 is lowered into the preliminary strengthening zone 13, it hesitates for a moment during which time the chilling liquid is turned on and contacts the opposite surfaces of the glass sheet 1.

The cooling to accomplish the preliminary strengthening should take place for a length of time sufficient to put the surface of the glass temporarily in tension and the marginal edge in compression. This length of time will vary depending on the heat transfer coefficient of the chilling liquid, the composition and thickness of the glass sheet and how the chilling liquid contacts the glass surface, whether in spray or flood form. Generally, however, the length of time of the cooling to accomplish the preliminary strengthening will be from 0.1 to 1 second, preferably 0.25 to 1 second.

After the edges of the glass sheet have been preliminarily strengthened, the glass is then subjected to liquid quenching to thermally temper the glass sheet through its entire thickness. The liquid-quenching operation can be carried out by any of the conventional techniques well known for liquid quenching. These techniques include, for example, spray quenching, flood quenching and dip quenching, with dip quenching being the preferred technique.

In the liquid quenching step, the heated glass sheet with the strengthened edges is contacted with a liquid quenchant for a time sufficient to cool the entire thickness of the glass to a temperature below the glass strain point. When glass is cooled through its strain point, the glass undergoes a transition from behaving as a viscous liquid to behaving as an elastic solid. Once the glass starts behaving as an elastic solid, it will no longer develop any residual stress by rapid cooling. Therefore, when the entire thickness of the glass has cooled to a temperature substantially below the strain point, the final degree of temper has been obtained. The length of time that the liquid quenchant must be contacted with the glass in order to cool the entire thickness of the glass to a temperature below its strain point will vary depending on, among other things, the temperature of the glass sheet, the heat transfer coefficient of the quenching liquid, the composition and thickness of the glass, and the method of contact, be it food quenching, spray quenching or dip quenching. As an example, for soda-lime-silicate glass having dimensions of 12 inch x 12 inch x 0.090 inch, heated to a temperature near its softening point and being dip quenched, the time of contact will be from about 20 to 30 seconds.

In FIG. 1, dip quenching is depicted. A liquid quenching bath 17 contains a liquid quenchant 19. After the glass has passed through the preliminary strengthening zone 13, such that the leading edge is put in compression, the glass sheet 1 is then immediately and completely immersed in the liquid quenchant 19.

The chilling liquids used for the preliminary strengthening and for the subsequent liquid quenching can be different, or, preferably, they can be the same. The chilling liquid used for the preliminary strengthening should have the capacity when it is contacted with the body of the glass between the edges to cool the body of the glass at a rate at least as great, preferably greater than the edges, such as to put the edges in compression without fracturing the glass. The criterion for the liquid quenchant used in the subsequent liquid quenching is that it have the capacity to chill rapidly the glass across its entire thickness to a temperature below its strain point, thereby achieving a high degree of temper in the resultant glass sheet.

To meet the above criteria, the chilling liquids must have a certain minimum cooling capacity. A measure of this cooling capacity is the heat transfer coefficient of the liquid. The heat transfer coefficient is defined as the heat exchange at the glass-liquid interface per unit of temperature difference-unit of time-unit of glass surface. For the purposes of this invention, the heat transfer coefficient is expressed as British Thermal Units/hour-square foot-degree Fahrenheit (B.t.u./hr.-ft.$^2$-° F.). In accordance with this invention, the heat transfer coefficient of the chilling liquids should be at least 150 B.t.u./hr.-ft.$^2$-° F., preferably within the range of 200 to 600 B.t.u./hr.-ft.$^2$-° F. Use of a chilling liquid which has a lower heat transfer coefficient will not set up necessary differential cooling patterns to put the glass edges in compression during the preliminary strengthening or to attain a final high degree of temper during the liquid-quenching step. Using a chilling liquid which has a higher heat transfer coefficient may exert too severe a thermal shock on the glass and as a result, fracturing of the glass in the preliminary strengthening step or in the liquid-quenching step may occur. In thermally tempering thinner glass, i.e., glass of about 0.050 to 0.090 inch in thickness, the chilling liquid should have a heat transfer coefficient in the upper ranges of the above set forth limits. With thin glass, heat exchange between the interior of the glass and the surface is appreciably more rapid than with thicker glass. Therefore, in order to achieve as high a degree of temper in thin glass as is obtainable with thicker glass, the heat transfer coefficient of the chilling liquid should be proportionately greater for thin glass than for thicker glass. With thicker glass, i.e., glass of about 0.100 to 0.500 inch in thickness, a high degree of temper can be obtained using chilling liquids which have a heat transfer coefficient in the lower ranges of the limits set forth.

Examples of chilling liquids which are particularly suitable in the practice of this invention are the oxyalkylene polymers, particularly polyoxyalkylene glycols which are hydroxyl-terminated oxyalkylene polymers. The oxyalkylene polymers can be homopolymers of ethylene oxide, propylene oxide or copolymers of ethylene oxide with one or more additional alkylene oxides, such as propylene oxide, butylene oxide and the like. The oxyalkylene polymers are produced by polymerizing an alkylene oxide or a mixture of alkylene oxides in the presence of a catalyst and a starter. Suitable catalysts are sodium and potassium hydroxides. The starters are compounds which have at least one active hydrogen atom. Suitable starters are water, monohydric alcohols such as methanol, ethanol, propanols, butanols, dihydric alcohols such as ethylene glycol, diethylene glycol, propylene glycol; trihydric alcohols such as glycerine, 1,1,1-trimethylol propane, 1,2,6-hexanetriol; tetrahydric alcohols such as pentaerythritol; hexahydric alcohols such as sorbitol; higher functional alcohols such as dipentaerythritol; monoamines such as methylamine, ethylamine, butylamine, aniline and ammonia; polyamines such as ethylenediamine, diethylenetriamine, toluene diamine; mono-polyfunctional amines such as diethanolamine, triisopropanolamine, aniline, dihydric phenols such as hydroquinone, catechol, resorcinol and 2,2-bis(4-hydroxyphenyl)propane. The products of such reaction will be linear or branched oxyalkylene polymers, depending on the functionality of the starter compound. The chains optionally can be terminated with hydroxyl groups. Also, envisioned by this invention is that some or all of these hydroxyl groups may be etherified or esterified.

The preferred oxyalkylene polymers are polyoxyalkylene glycols which are liquids at room temperature and which are water soluble. Oxyalkylene polymers which are solids at room temperature can be used but they must be melted before tempering operations are conducted. Water insoluble polyoxyalkylene polymers can also be used, but necessitate cleaning the glass sheet after tempering with something other than a water rinse. Among the particular types of polyoxyalkylene polymers which can be used in the tempering process of this invention are the following:

Polyoxyethylene glycols,

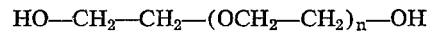

$$HO-CH_2-CH_2-(OCH_2-CH_2)_n-OH$$

where $n=1$ to 10,000, range at room temperature from water-white liquids to waxy solids. Those above 1000 in molecular weight are sold commercially under the trademark Carbowax. Although pure polyoxyethylene glycols of a specified molecular weight can be prepared and can be used in the practice of this invention, the commercially available compounds are actually mixtures of a number of polyoxyethylene glycol polymers of various molecular weights. The commercially available polyoxyethylene glycols up to a molecular weight of about 700 are water-white liquids at room temperature. Those having molecular weights of 1000 or above are solids that vary in consistency at room temperature from a grease to a hard wax.

Polyoxypropylene glycols,

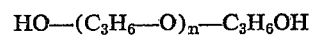

$$HO-(C_3H_6-O)_n-C_3H_6OH$$

$n=1$ to 10,000, are colorless to light yellow viscous liquids. They are commercially available in molecular weights ranging from approximately 400 to 2000. The low molecular weight polyoxypropylene glycols, i.e., up to a molecular weight of 500, are completely water soluble, while those of higher molecular weight, i.e., from 1000 to 2000, are only slightly soluble in water. Those having an intermediate molecular weight, i.e., from 600 to 900, are moderately soluble in water, about 10 to 20% at room temperature. Polyoxypropylene glycols are commercially available under the trademark Niax.

For the most part, the oxyalkylene polymers, which are used in the practice of this invention, contain both oxyethylene groups and higher oxyalkylene groups such as oxypropylene and oxybutylene groups,

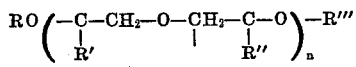

where R, R', R" and R''' can be selected from H, —CH$_3$—, C$_2$H$_5$, C$_3$H$_7$— and C$_4$H$_9$, and $n=1$ to 30,000.

The molecular weights of the mixed oxyalkylene polymers useful in the practice of this invention will be about 600 to 400,000, preferably 600 to 40,000. The mixed oxyalkylene polymers have good solubility in water and are generally liquids at ambient temperatures, even in the higher molecular weight ranges where they are very viscous liquids. In the case of copolymers of ethylene oxide with other alkylene oxides, particularly propylene oxide, the oxyalkylene chain can be composed of blocks of oxyethylene groups connected to blocks of, for instance, oxypropylene groups. Also, the oxyalkylene chains may be heteric or random mixtures of oxyethylene and oxypropylene groups. The ratio of oxyethylene or other oxyalkylene groups may vary, for example, from about 50:50 to about 90:10. The amount of oxyethylene groups in a molecule is such that the oxyalkylene polymers are moderately soluble in water at ordinary temperatures and the amount of higher oxyalkylene groups is such that the oxyalkylene polymers remain liquid at ordinary temperatures at higher molecular weights. Mixed polyoxyalkylene glycols are commercially available under the trademark Ucon.

Other liquids which can be utilized in the instant process are silicone fluids and hydrocarbon oils.

The silicone fluids of the invention are dialkyl, diaryl or alkyl-aryl fluids. The fluids are linear polymers of alternating silicon and oxygen atoms, each silicon atom having two organic groups attached to it. The chemical formula for the silicone fluids is:

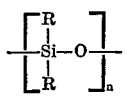

where $n$ varies from 9 to 100, and R is selected from alkyl and/or aryl groups. R can be selected from lower alkyl groups having 1 to 4 carbon atoms. When R is methyl, the above formula depicts the familiar dimethyl silicone fluids. Also R can be selected from aryl groups, especially phenyl groups and alkyl and halo substituted phenyl groups. The incorporation of phenyl groups into the polysiloxane polymer backbone increases the oxidative stability of the fluid. The larger the value of $n$ in the above formula, the higher the molecular weight and the higher the viscosity is in the resulting silicone fluid. In the practice of this invention, silicone fluids having a molecular weight of from about 675 to 11,000 and a viscosity of from about 5 to 200 centistokes at 77° F. are contemplated.

Silicone fluids are sold commercially under the trade names Dow Corning Silicone Fluids and General Electric SF. Silicone fluids are well known in the art and are described in An Introduction to the Chemistry of the Silicones, 2nd Edition, by E. G. Rockow, Wiley, New York, 1951.

One method of preparing the silicone fluids useful in the invention is to hydrolyze in an acidic-aqueous medium dialkyl, diaryl and/or alkyl, -aryl dichlorosilanes,

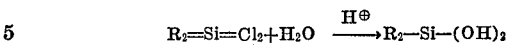

wherein R=alkyl and/or aryl. The silane diol is unstable and self-condenses to a polysiloxane, or what is commonly known as the silicone fluid.

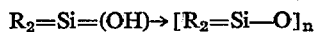

wherein R=alkyl and/or aryl and $n=9$ to about 100.

To prepare low molecular weight or low viscosity products a trialkyl silane such as trimethyl chlorosilane can be added as an end blocker. Thus, for example, if two moles of trimethyl chlorosilane are added for each mole of dimethyldichlorosilane, the following reaction occurs:

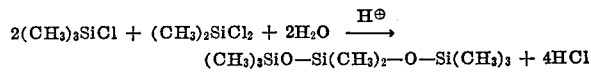

Reduction of the amount of trialkyl silane allows, of course, the formation of higher molecular weight compounds. This end blocking technique is an effective way to control viscosity and also serves to stabilize the viscosity of the silicone fluid against further polymerization upon standing.

The hydrocarbon oils useful in the practice of this invention are the so-called heat treating oils which are well known in the art of metal tempering. Such oils are mineral oils which are obtained from coking operations or petroleum refining. The oils are characterized in that they have low volatility, have resistance to high-temperature, have resistance to oxidation, and have a high flash point. More specifically, the mineral oils useful in the practice of this invention should have a boiling range from about 400° to 800° F.; a flash point from above about 300° to 500° F. and a SUS viscosity within the range of from about 100 to 2500 seconds at 100° F. If the mineral oils used are petroleum derivatives, they may be paraffinic base, aromatic base, i.e., naphthenic or mixed base oils. Present in the mineral oil, of course, can be various additives such as anti-oxidants, emulsifiers, thermal stabilizers, viscosity modifiers, surfactants and the like. Such mineral oils are well known in the art of metal tempering and are further described in detail in Metalworking Lubricants; Their Selection, Application and Maintenance, by E. L. Bastian, McGraw-Hill, New York, 1951 and Lubricants and Cutting Oils for Machine Tools by W. G. Forbes, Wiley, New York, 1943.

The liquid-quenching media of this invention should be essentially water free. By essentially water free is meant that the quenching medium contains less than 5 percent by weight water. If greater amounts of water are present, there will be an increased tendency for the glass sheet to fracture during the tempering operations. This problem is particularly serious with thinner glass sheets, i.e., sheets having a thickness of about 0.050 to 0.090 inch.

The liquid-quenching media of the instant invention can contain various additives, such as viscosity modifiers, suspension and emulsion stabilizers, wetting agents, detergents, anti-oxidants and thermal stabilizers. Examples of such additives include carboxy methyl cellulose, sodium alkyl sulfonate, sodium dioctyl sulfosuccinate and tert-butyl catechol.

The various liquid-quenching fluids may be utilized alone or may be blended with one or more liquids to provide the liquid-quenching fluid to be employed.

The glass which is tempered according to the method of this invention is typically a silicate-type of flat glass, particularly soda-lime-silicate glass, lead-silicate glass and borosilicate glass. The nature and production of silicate glasses is well known in the art, and generally is described in the Encyclopedia of Chemical Technology, by Kirk-Othmer, published by Interscience Encyclopedia Inc., New York, N.Y., volume 7, pages 181–189. The method of the invention has been found to be particularly useful in the tempering of thinner glass sheets, i.e., glass sheets having a thickness of about 0.050 to 0.125 inch. The method of the invention is generally applicable to tempering glass sheets of from 0.050 to 1 inch or more in thickness.

The geometric configuration of the glass treated in accordance with this invention is not particularly critical in that flat-glass sheets and curved-glass sheets, for example, curved-glass windshields may be tempered using the quenching fluids hereinabove described. The instant process may be readily adapted to either a continuous or a semi-continuous operation to produce resultant tempered glass sheets having an abraded resistance to fracture by stress of the order of 10,000 to 40,000 pounds per square inch and a central tensile stress of the order of 5,000 to 20,000 pounds per square inch.

Figure 2:
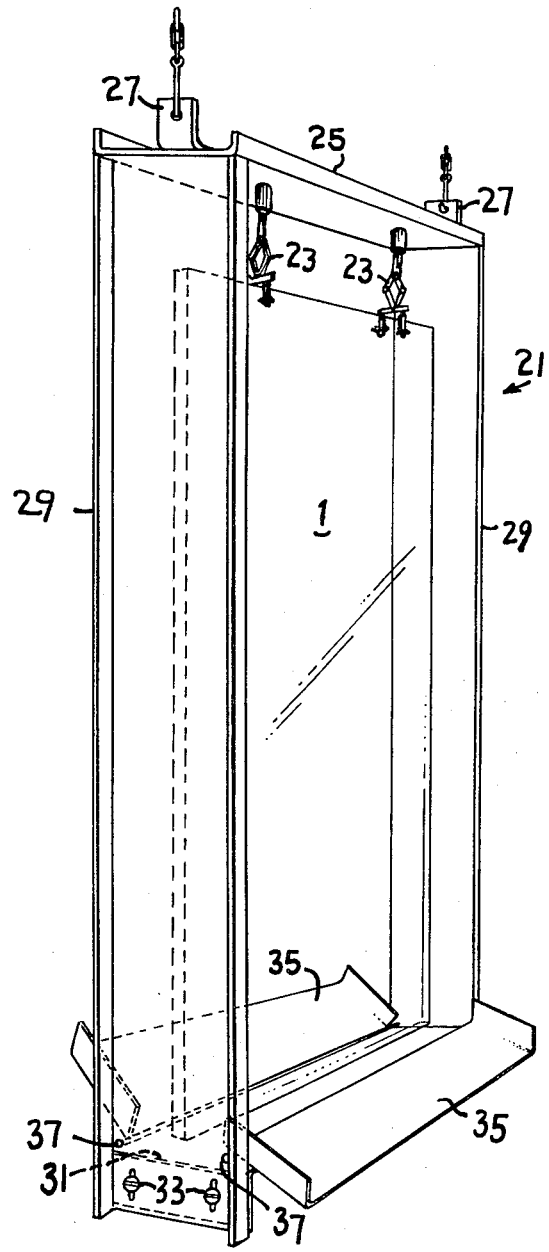
FIG. 2 is a perspective drawing of a dip-quenching apparatus suitable for use in practicing the method of the instant invention.

An apparatus suitable for use in practicing the method of the instant invention is shown in FIGS. 2 through 5. Turning to FIG. 2, there is shown a glass sheet 1 supported by tongs 23 within a dip-quenching apparatus generally indicated as 21. The tongs 23 are affixed to a roof 25 which has mountings or legs 27 on its supper surface which enable the entire dip-quenching apparatus 21 to be raised and lowered. The roof 25 is supported at its ends by two upright members 29 which extend downwardly where they are affixed at 33 with a base 31. Hingedly mounted on the base 31 are two baffles 35. The baffles are substantially coextensive with the base and are mounted on hinges 37 such that the baffles can be pivoted through roughly a 120° angle as shown in FIGS. 3-5.

To use the apparatus in practicing the method of the invention, the apparatus 21 with the supported glass sheet 1 is positioned within a furnace (not shown) to heat the glass sheet to a temperature required for thermal tempering. While in the furnace, the baffles 35 are in their normal "down" position as generally shown in FIG. 3 to insure that the entire glass sheet is heated uniformly. After the glass has been heated to the required temperature, the dip-quenching apparatus is lowered from the furnace towards the quenching bath 17 as is shown generally in FIG. 3. When the baffles 35, in the downward position, strike the quenching liquid as is shown in FIG. 4, the baffles are pivoted on their hinges 37 to an upright position. As the dip-quenching apparatus 21 is further lowered into the quenching bath, the liquid quenchant flows over the upright baffles 35 with sufficient flow to strike a portion of the surface of the glass sheet 1 in an area immediately behind the leading edge 15. Striking of the glass with the chillant 19 in this manner puts the leading edge in compression such that it can then withstand the subsequent thermal shock when the leading edge 15 comes in contact with the quenching liquid 19. FIG. 5 shows the entire glass sheet in contact with the quenching liquid.

The dip-quenching apparatus 21 as shown in FIGS. 2 through 5 offers a simple, convenient, one-step approach to the concept of preliminarily cooling the body of the glass to put the leading edge in compression. Using the dip-quenching apparatus 21 allows one to forego the necessity of having to pass the glass through a preliminary cooling zone as shown in FIG. 1. Also, the dip-quenching apparatus 21 allows the dip-quenching bath 17 to be utilized for both preliminary and final cooling. However, the invention should not be limited to the particular quenching apparatus 21. Once this invention has been disclosed and understood, those skilled in the art will be able to practice the invention with numerous quenching apparatus of which the dip-quenching apparatus 21 is only one variety.

What is claimed is:

1. A process for thermally tempering glass sheet by multiple cooling steps comprising:
   (a) heating the glass to a temperature substantially above its strain point;
   (b) preliminarily cooling of the glass such that a surface portion inside of and adjacent to a marginal edge is cooled at a greater rate than the adjacent marginal edge; and
   (c) final cooling of the glass to a temperature below the glass strain point by immersing the glass in a quenching liquid; the immersing taking place such that said marginal edge initially contacts the quenching liquid.

2. The process of claim 1 in which the preliminary cooling is accomplished by contacting the surface portion of the glass inside of and adjacent to the marginal edge with an essentially water-free chilling liquid which has a heat transfer coefficient of at least 150 British thermal units/hour-square foot-degree Fahrenheit.

3. The process of claim 2 in which the chilling liquid has a heat transfer coefficient at least as great as the quenching liquid.

4. The process of claim 3 in which the chilling liquid is the same as the quenching liquid.

5. The process of claim 2 in which the chilling liquid is flowed onto the glass.

6. The process of claim 2 in which the chilling liquid is sprayed onto the glass.

7. The process of claim 1 in which the liquid-quenching agent has an average heat transfer coefficient at the glass-liquid interface of at least 125 British thermal units/hour-square foot-degree Fahrenheit.

8. The process of claim 7 in which the average heat transfer coefficient is within the range of 125 to 600 British thermal units/hour-square foot-degree Fahrenheit.

9. The process of claim 1 in which the glass is soda-lime-silica glass.

10. The process of claim 9 in which the glass is a flat-glass sheet having a thickness of about 0.050 to 0.125 inch.

11. A process for thermally tempering flat-glass sheet comprising:
   (a) heating the glass to a temperature substantially above its strain point;
   (b) contacting a surface portion of the flat-glass sheet adjacent an edge with a chilling liquid such that the edge is put in compression;
   (c) immersing flat-glass sheet in a liquid-quenching agent such that the edge which has been put in compression initially contacts the quenching liquid and passes therethrough until the entire glass sheet is completely immersed, and
   (d) chilling the glass until it is cooled to a temperature below the glass strain point.

References Cited

UNITED STATES PATENTS 2,311,846    2/1943    Littleton et al. _____ 65—114 X

FOREIGN PATENTS 229,574    2/1944    Switzerland _____ 65—116

ARTHUR D. KELLOGG, Primary Examiner

U.S. Cl. X.R.

65—104